United States Patent Office 3,438,860
Patented Apr. 15, 1969

3,438,860
PROCESS FOR THE PREPARATION OF
PYRIDOXAL-5'-PHOSPHATE
Osamu Shoji, Ikeda-shi, Kanae Yokogawa, Amagasaki-shi, Noriyuki Sunahara, Kyoto, and Koichi Ogata, Minoo-shi, Japan, assignors to Dainippon Pharmaceutical Co., Ltd., Osaka, Japan, a corporation of Japan
No Drawing. Filed Feb. 24, 1967, Ser. No. 618,337
Claims priority, application Japan, Mar. 4, 1966, 41/13,443; Oct. 29, 1966, 41/71,485
Int. Cl. C12b 1/00
U.S. Cl. 195—28
3 Claims

ABSTRACT OF THE DISCLOSURE

Pyridoxine-5'-phosphate is subjected to oxidizing action of enzymes of microorganisms, e.g., *Alcaligenese faecalis*, in the presence of an α-amino acid such as glutamic acid, and a metal salt such as zinc sulfate. From the reaction broth, pyridoxal-5'-phosphate is separate in the form of a calcium salt of the Schiff base-metallic chelate compound. The salt is dissolved in sulfuric acid, and the solution is treated with a cation-exchange resin, and from that resin pyridoxal-5'-phospate is eluted with water. The process is advantageous in view of the higher conversion when operated at higher concentration of the starting phosphate.

---

This invention relates to an improvement in the preparation of pyridoxal-5'-phosphate by oxidation of pyridoxine-5'-phosphate or pyridoxamine-5'-phosphate with enzymes of microorganisms.

Preparation of pyridoxal-5'-phosphate (hereinafter may be abbreviated as "PAL-P") by oxidation of pyridoxine-5'-phosphate (hereinafter may be abbreviated as "PIN-P") or pyridoxamine-5'-phosphate (hereinafter may be abbreviated as "PAM-P") with enzymes of microorganisms is disclosed by K. Ogata et al. in Agr. Biol. Chem., vol. 29, No. 3, pp. 200–207 (1965). The oxidation activity of the enzymes tends to be inhibited by PAL-P. Therefore, according to the above disclosure lysine monohydrochloride was added to the system in order to reduce the inhibition of PAL-P on the oxidation reaction. Addition of an amino acid presumably converts PAL-P to its Schiff base with the amino acid, said Schiff base having less inhibition than that of PAL-P on the oxidation reaction.

However, the advantage of such addition of amino acid is limited. To wit, when concentration of the starting PIN-P or PAM-P is relatively low, for example, such as 1 mg. per milliliter of the reaction mixture, the starting phosphate can be converted to PAL-P at a high rate, but with the increase of the substrate concentration, the conversion's rate falls low.

Surprisingly, it was found that if the oxidation of PIN-P or PAM-P with enzymes of microorganisms is carried out in the presence of, per mol part of the starting phosphate, 1–20 mol parts of α-amino acid which can form Schiff base with PAL-P and 0.5–4 mol parts of a certain metallic salt, the object PAL-P is obtained at high rate of the conversion even when the concentration of the starting phosphate in the reaction mixture is high.

Conversion's rate to PAL-P in case of oxidizing PIN-P of indicated concentrations with ultrasonic extract of *Alcaligenes faecalis* are shown in the table below, columns 3, 4, 5 and 6. The experiments were run under identical conditions, except that the amounts of sodium glutamate and zinc sulfate present in the system were varied as indicated in the same table.

TABLE.—CONVERSION'S RATE OF PIN-P (PERCENT)

| Additive | Amount of additive in 100 ml. of the medium | Initial concentration of PIN-P | | | |
|---|---|---|---|---|---|
| | | 1 mg./ml. | 3 mg./ml. | 5 mg./ml. | 10 mg./ml. |
| Na-glutamate | 0 | 40 | 23 | 14 | 7 |
| Zinc sulfate | 0 | | | | |
| Na-glutamate (g.) | 3 | 100 | 58 | 34 | 20 |
| Zinc sulfate | 0 | | | | |
| Na-glutamate | 0 | 0 | 0 | 0 | 0 |
| Zinc sulfate (g.) | 1.5 | | | | |
| Na-glutamate (g.) | 3 | 100 | 100 | 100 | 90 |
| Zinc sulfate (g.) | 1.5 | | | | |

Considering that the use of zinc sulfate alone completely inhibits the oxidation activity of the enzyme, it is indeed surprising that the concurrent use of sodium glutamate and zinc sulfate achieves the high conversion, particularly even when the concentration of PIN-P is high.

This invention is not limited by the operation mechanism in any sense, but it is believed that the PAL-P formed by the oxidation activity of enzymes of microorganisms is converted to metallic chelate compound of its Schiff base with amino acid, said chelate compound having no inhibition on the enzyme's oxidation activity.

It is found that the metallic salts suitable for use in the invention are those of the metal selected from zinc, nickel, magnesium, iron, copper, aluminum, vanadium, mercury and arsenum. Anion of these salts is not important for the purpose of this invention, but for practical purpose chloride or sulfate is advantageous. Salts of zinc, nickel and magnesium are particularly preferred. Preferred amount of such salt for use being about 1–1.5 mol parts per 1 mol part of the starting phosphate, with the use of at least 0.5 mol part of the salt the benefit of the invention can be enjoyed. As the amount of the metallic salt approaches to its upper limit (4 mol parts per), the inhibition effect on the enzyme activity of the excessive metallic salt starts to be observed.

The α-amino acid suitable for the use in this invention can be defined as α-amino acid which can form Schiff base with PAL-P. The preferred α-amino acids can be represented by the formula

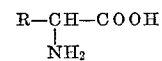

wherein R stands for hydrogen, a lower alkyl having up to 5 carbon atoms optionally substituted by amino, carboxy, carbamoyl, guanidino, hydroxy or alkylthio of up to 3 carbon atoms. Those preferred α-amino acids include lysine, α,α'-diaminopimelic acid, ornithine, arginine, glutamine, glutamic acid, asparagine, aspartic acid, valine, glycine, alanine, leucine, isoleucine, serine, threonine and methionine. It seems that the condensation product of histidine, tryptophane or cysteine with PAL-P shows cyclization under the reaction conditions of the invention and fails to possess the grouping, —CH=N—, characteristic to Schiff base. It should be, therefore, construed that histidine, tryptophane and cysteine are not appropriate for the purpose of the invention and cannot be classified as an α-amino acid which can form Schiff base with PAL-P. In the process of the subject invention, such α-amino acid which can form Schiff base with PAL-P can be used at the quantitative ratio of 1–20 mol parts per 1 mol part of the starting phosphate, the range of about 3–10 mol parts being particularly preferred. Thus, in the preferred embodiment of the invention, per 1 mol part of the starting phosphate, about 1–1.5 mol parts of the said metallic salt and about 3–10 mol parts of the α-amino acid are used. Furthermore, in case of using an increased amount of the metallic salt, the amount of the α-amino acid also should preferably be increased.

Any enzyme of microorganisms which can oxidize PIN-P or PAM-P to PAL-P may be used in the invention. The microorganisms which produce suitable enzymes are reported by K. Ogata et al. in Agr. Biol. Chem., vol. 29, No. 3, pp. 200–207 (1965), among which *Alcaligenes faecalis, Micrococcus ureae, Azotobacter agili, Pseudomonas aeruginosa, Pseudomonas fragi* and *Pseudomonas polycolor* being particularly preferred. The enzymes produced by those microorganisms may be used in the form of intact cell or ultrasonic extract, the most advantageous form for use being autolysate.

The oxidation reaction in accordance with the invention is advantageously performed under the condition at which the enzyme employed is active, for example, pH 8–10, particularly pH 8–9, at temperatures ranging about 20–35° C. preferably at about 30° C., optionally in the presence of suitable coenzymes. In order to maintain pH of the reaction medium within the optimum range as well known, suitable buffer solution such as tris-HCl buffer, carbonate buffer, dimethyl glycine buffer and glycine-NaOH buffer can be used.

It is further found that the desired PAL-P in the reaction mixture resulting from the above oxidation reaction can be very advantageously isolated, by the steps comprising removing from the reaction solution the aggregate formed by lowering the pH of the solution below about 2, then precipitating the object PAL-P in the form of a calcium or barium salt of its Schiff base-metallic chelate compound at the pH of 5.0–8.0, dissolving the precipitate in an aqueous solution of an acid of nonoxidizing nature, treating the so obtained aqueous solution with a cation exchange resin and eluting PAL-P from the resin.

When pH of the reaction broth is adjusted to below 2 by addition of an acid, e.g., hydrochloric acid, the cells and other proteins in the broth aggregate. After removing the aggregate, the separation of PAL-P from the solution as a calcium or barium salt of its Schiff base-metallic chelate compound is performed by either:

(1) The addition of at least 1 mol part, per 1 mol part of the starting phosphate, of a calcium or barium salt to the solution, in case at least 1 mol part, per 1 mol part of the starting phosphate, of the metallic salt was used in the reaction, or (2) In case the metallic salt of an amount less than 1 mol part per 1 mol part of the starting phosphate was used in the reaction, the addition of the same metallic salt of an amount sufficient to make the total quantity of the metallic salt present in the system at least 1 mol part per 1 mol part of the starting phosphate, and at least 1 mol part, per 1 mol part of the starting phosphate, of calcium or barium salt.

As the calcium or barium salts suitable for the addition to the solution, inorganic acid salts such as calcium chloride, barium chloride, calcium carbonate, barium carbonate, calcium hydroxide and barium hydroxide, and organic acid salts such as calcium acetate and barium acetate may be named. The calcium or barium salt of the Schiff base-metallic chelate compound has been found to have a very low solubility in water at a pH within the range of about 5.0–8.0. Accordingly, upon adjusting the pH of the solution to a value within the range of about 5.0–8.0, if necessary by addition of an alkali, PAL-P is separated from the solution as the calcium or barium salt of the said chelate compound. Addition of methanol or acetone in this occasion contributes to make the precipitate formation still more quantitative, the sufficient amount of such methanol or acetone being equal volume or less.

Thus obtained precipitate is dissolved in an aqueous solution of nonoxidizing acid such as hydrochloric or sulfuric acid, and treated with a cation exchange resin. To wit, the solution is poured in a column of cation exchange resin so that the said chelate compound should be absorbed onto the resin. Contacting the resin with water, preferably with deoxygenized water, the desired PAL-P is selectively eluted. Crystal PAL-P monohydrate is obtained by concentration of the eluate under reduced pressure. Examples of cation exchange resins suitable for use in this invention include Dowex 50W×8(H+ form), Amberlite IR 120(H+ form) and Diaion SK—1B(H+ form).

The following examples are to illustrate the process of this invention, in which percents are represented by weight/volume unless otherwise indicated.

EXAMPLE 1

Alcaligenes faecalis was grown in a medium comprising 1.0% of glucose, 1.5% of peptone, 0.2% of yeast extract, 0.5% of $K_2HPO_4$, 0.1% of $KH_2PO_4$, 0.2% of NaCl and 0.02% of $MgSO_4 \cdot 7H_2O$, the balance being tap water.

The initial pH of the medium was 7.2, and the microorganism was caltured in 120 ml. of the medium placed in a 500 ml. flask, shaken for 72 hours at 30° C. The harvested cells were washed twice with 0.8% potassium chloride solution. The washed cells were suspended in 100 ml. of 0.1 M potassium phosphate buffer of pH 7.0 and treated with a Kaijo-Denki 19 kc./s. ultrasonic oscillator for 20 minutes at temperatures between 0–10° C. The intact cells and debris were removed, and the resultant supernatant solution was used in the following reaction.

The reaction system consisting of 100 ml. of the above ultrasonic extract, 100 ml. of 1 M tris-HCl buffer (pH 8.6), 600 mg. of PIN-P monohydrate (2.25 millimol), 3 g. (16.4 millimol) of lysine monohydrochloride and 1.2 g. (4.17 millimol) of zinc sulfate heptahydrate was reacted at 30° C. for 10 hours with shaking. As the result, 2.95 mg./ml. of PAL-P was formed, the conversion's rate being 98%. The lysine monohydrochloride was added after neutralization.

The PAL-P was determined by spectrophotometric measurement of the complex formed between PAL-P and phenylhydrazine by the procedure of Wada and Snell. [J. Biol. Chem., vol. 236, p. 2089 (1961)].

EXAMPLE 2

Alcaligenes faecalis was grown in a medium comprising 2.0% of glycerine, 2.0% of corn steep liquor, 0.5% of $K_2HPO_4$, 0.1% of $KH_2PO_4$, 0.2% of NaCl and 0.02% of $MgSO_4 \cdot 7H_2O$, the balance being tap water, and having an initial pH of 7.2. The culture was carried out with 140 ml. of the medium placed in a 500 ml. flask, and which was shaken for 72 hours at 30° C. The harvested cells were autolyzed by shaking with 100 ml. of toluene for an hour.

The reaction system consisting of 100 ml. thus obtained autolysate, 100 ml. of 1 M sodium carbonate buffer (pH 8.6), 1000 mg. (3.74 millimol) of PIN-P monohydrate, 6.5 g. (34.7 millimol) of sodium glutamate monohydrate and 2 g. (9.83 millimol) of magnesium chloride hexahydrate was reacted at 30° C. for 15 hours with shaking, and thereby 5 mg./ml. of PAL-P was formed. The conversion's rate was 100%. The said PAL-P was determined in the same manner as described in Example 1.

EXAMPLE 3

One hundred (100) ml. of the autolysate obtained in Example 2 was added to a liquid mixture consisting of 100 ml. of 1 M sodium carbonate buffer (pH 8.5), 2000 mg. (7.48 millimol) of PIN-P monohydrate, 6 g. (32.0 millimol) of sodium glutamate monohydrate, 10.2 mg. ($2 \times 10^{-2}$ millimol) of flavine mononucleotide dihydrate and 2.2 g. (9.26 millimol) of $NiCl_2 \cdot 6H_2O$ and reacted at 30° C. for 30 hours with shaking. Ten (10) mg./ml. of PAL-P was formed with the conversion's rate of 100%. The same PAL-P was determined in the similar manner as described in Example 1.

EXAMPLE 4

One hundred (100) ml. of the autolysate of Alcaligenes faecalis obtained by the method described in Example 2, 100 ml. of 1 M sodium carbonate buffer (pH 8.6), 2 g. of PIN-P monohydrate, 6.5 g. of sodium glutamate monohydrate and 2.0 g. of zinc sulfate heptahydrate were mixed and reacted at 30° C. for 15 hours with shaking. The resultant reaction broth was adjusted to have a pH of 1.0 with conc. hydrochloric acid, and so aggregated cells and proteins were removed. To the remaining solution, 200 ml. of methanol was added followed by further addition of 6 g. of calcium chloride. Then the system was neutralized to pH 5.0 with sodium hydroxide, whereupon dark yellow calcium salt of Schiff base-chelate compound was precipitated. The precipitate was dissolved in conc. hydrochloric acid and after it pH was adjusted to 2.5, was passed through Dowex 50W×8(H+) to have the product adsorbed thereonto. PAL-P was eluted into deoxygenized water, and the eluate was concentrated under reduced pressure at temperatures below 50° C. Whereby 18.2 g. of crystal PAL-P monohydrate was obtained.

The product was confirmed to be perfectly pure PAL-P monohydrate as the result of elementary analysis, ultraviolet and infrared absorption curves, electrophoresis and paper chromatography.

We claim:
1. In the process for the preparation of pyridoxal-5'-phosphate by oxidation of pyridoxine-5'-phosphate or pyridoxamine-5'-phosphate with the enzymes of microorganisms, the improvement comprising carrying out said oxidation in the presence of 1–20 mol parts of an α-amino acid which can form a Schiff base with pyridoxal-5'-phosphate and 0.5–4 mol parts of a salt of a metal selected from zinc, nickel, magnesium, iron, copper, aluminum, vanadium, mercury and arsenum, said mol part values being based on 1 mol part of the starting phosphate.

2. The process of claim 1 in which the oxidation is carried out in the presence of 3–10 mol parts of an α-amino acid of the formula

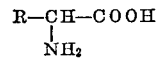

wherein R stands for a member of the group consisting of hydrogen, lower alkyl having 1 to 5 carbon atoms and substituted lower alkyl in which the alkyl moiety having 1 to 5 carbon atoms and the substituent being selected from amio, carboxy, carbamoyl, guanidino, hydroxy and alkylthio of 1 to 3 carbon atoms which can form a Schiff base with pyridoxal-5'-phosphate and 1–1.5 mol parts of a salt of a metal selected from zinc, nickel, magnesium, iron, copper, aluminum, vanadium, mercury and arsenum, said mol part values being based on 1 mol part of the starting phosphate.

3. A process for the preparation of pyridoxal-5'-phosphate by oxidation of pyridoxine-5'-phosphate or pyridoxamine-5'-phosphate with the enzymes of microorganisms, comprising carrying out the oxidation in the presence of 1–20 mol parts of an α-amino acid which can form a Schiff base with pyridoxal-5'-phosphate and 0.5–4 mol parts of a salt of a metal selected from zinc, nickel, magnesium, iron, copper, aluminium, vanadium, mercury and arsenum, said mol part values being based on 1 mol part of the starting phosphate, removing from the resultant reaction solution the aggregate formed by lowering the pH of the solution below about 2, precipitating from the solution the object pyridoxal-5'-phosphate in the form of a calcium or barium salt of its Schiff base-metallic chelate compound at a pH of 5.0 to 8.0, dissolving thus obtained precipitate in an aqueous solution of a nonoxidizing acid, applying the resultant aqueous solution to a column of cation-exchange resin and eluting the object pyridoxal-5'-phosphate from the same resin.

References Cited

Goodwin, The Biosynthesis of Vitamins and Related Compounds, Academic Press, London and New York, pp. 163–166 (1963).

ALVIN E. TANENHOLTZ, Primary Examiner.

260—297.5